US 8,175,338 B2

(12) United States Patent
Ma

(10) Patent No.: US 8,175,338 B2
(45) Date of Patent: May 8, 2012

(54) MAP-BASED AESTHETIC EVALUATION OF DOCUMENT LAYOUTS

(75) Inventor: Choi Chi Evelene Ma, Auburn (AU)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 12/331,850

(22) Filed: Dec. 10, 2008

(65) Prior Publication Data

US 2009/0161916 A1 Jun. 25, 2009

(30) Foreign Application Priority Data

Dec. 20, 2007 (AU) .................................. 2007254598

(51) Int. Cl.
*G06K 9/00* (2006.01)
(52) U.S. Cl. .................................. 382/112; 250/559.04
(58) Field of Classification Search .................. 382/100, 382/112; 250/559.01–559.08
See application file for complete search history.

(56) References Cited

U.S. PATENT DOCUMENTS

| 6,816,847 | B1 | 11/2004 | Toyama |
| 6,970,235 | B2 * | 11/2005 | Christophersen ............... 356/71 |
| 7,136,511 | B2 | 11/2006 | Harrington et al. ............ 382/112 |
| 7,266,222 | B2 * | 9/2007 | Harrington et al. ............ 382/112 |
| 7,561,722 | B2 * | 7/2009 | Harrington ..................... 382/112 |
| 2003/0210803 | A1 * | 11/2003 | Kaneda et al. ................. 382/100 |
| 2006/0056660 | A1 * | 3/2006 | Tojo ................................ 382/112 |
| 2006/0155699 | A1 | 7/2006 | Purvis et al. ...................... 707/6 |
| 2006/0248071 | A1 | 11/2006 | Campbell et al. ................. 707/5 |
| 2006/0282288 | A1 * | 12/2006 | Rodriguez et al. ................ 705/2 |
| 2007/0061384 | A1 | 3/2007 | Harrington et al. |
| 2008/0025555 | A1 * | 1/2008 | Visan et al. .................... 382/100 |
| 2008/0063240 | A1 | 3/2008 | Keng et al. |

FOREIGN PATENT DOCUMENTS

JP 2004-094438 A 3/2004

OTHER PUBLICATIONS

Notice of Acceptance—Australian Patent Appln. No. 2007254598, Australian Patent Office, Mar. 10, 2011.

* cited by examiner

*Primary Examiner* — Anand Bhatnagar
(74) *Attorney, Agent, or Firm* — Fitzpatrick, Cella, Harper & Scinto

(57) ABSTRACT

A method is disclosed for determining the aesthetic quality of a document page. The method partitions the document page into a plurality of regions according to a predetermined map. Each region is then evaluated to determine whether the region is of acceptable aesthetic quality according to a predetermined profile corresponding to the region and defined by the map. The profile comprises (i) one or more measures of region properties; (ii) an acceptability rule corresponding to each measure; and (iii) a region decision rule (435, 440) based on the results of one or more of the acceptability rules. The method then determines the aesthetic quality for the document page based on the aesthetic quality acceptability of each region and a predetermined page rule defined by the map.

17 Claims, 15 Drawing Sheets

MAP-BASED AESTHETIC EVALUATION OF DOCUMENT LAYOUTS

TECHNICAL FIELD

The current invention relates to document layout, design, and analysis and, in particular, to methods which measure the aesthetic quality of a document based upon characteristics of the document.

BACKGROUND ART

With the growing popularity of variable data printing technology and other automatic document layout technology, document authors can efficiently produce customised documents in large quantities in a short period of time.

In order to reduce labour cost and processing time for monitoring the quality of many generated documents, different methods have been explored. One approach is to evaluate the aesthetic quality of documents using software algorithms so that documents of poor quality can be identified or screened out automatically. There exist a number of methods that examine different aspects of document appearance to assess the aesthetic quality of a document. However, those methods generally aim to generate a single score to reflect measured aesthetic quality. When such a score falls below a predefined threshold, a document may have an unacceptable aesthetic quality. Unfortunately, no information apart from the single score is provided. In other words, there is no way to figure out what aspect of the document makes the document of poor quality. Typically such documents must be manually examined to ascertain why the score was below the threshold and to determine what corrections may be necessary to restore the document to suitability.

Aesthetic quality is a subjective judgement depending on the eyes of the beholder. Given a set of documents, different evaluators may place emphasis on different parts of the documents based on the goals and requirements of application contexts. Known methods are limited and inflexible as they provide no way to allow users to impose their own individualistic perception into the process of aesthetic evaluation of documents.

Different types of documents comprise different layout structures. Some documents, such as product brochures, are made up of different sections of different design styles contributing to the overall theme or layout. Nevertheless, current aesthetic evaluation methods measure aesthetic quality based on the assumption that documents only have a single design style. Accordingly, those methods may not be able to accurately evaluate documents containing multiple disparate design styles.

SUMMARY

It is an object of the present invention to substantially overcome or at least ameliorate one or more disadvantages of known aesthetic evaluation methods.

In accordance with one aspect of the present invention there is disclosed a method of determining an aesthetic quality of a document page, said method comprising the steps of:

(a) providing a map defining (1) a plurality of map regions, each of said map regions has one or more profiles, and (2) a page rule;

(b) partitioning the document page into a plurality of document regions according to said map regions of the provided map;

(c) evaluating each said partitioned document region to determine whether said document region is of acceptable aesthetic quality based upon said provided profile corresponding to each said partitioned document region, said profile comprising:

(i) one or more measures of region properties; and (ii) an acceptability rule corresponding to each said measure to determine a regional aesthetic quality acceptability (d) determining said aesthetic quality for said document page based on the determined regional aesthetic quality acceptability and said page rule defined by said map.

Other aspects are also disclosed.

BRIEF DESCRIPTION OF THE DRAWINGS

One or more embodiments of the present invention will now be described with reference to the following drawings, in which.

DETAILED DESCRIPTION INCLUDING BEST MODE

Disclosed are methods for evaluating the aesthetic quality of document pages and providing informative evaluation results as feedback. In the present disclosure, aesthetic quality refers generally to the degree to which pleasure can be derived from the appearance of a document.

Figure 1:
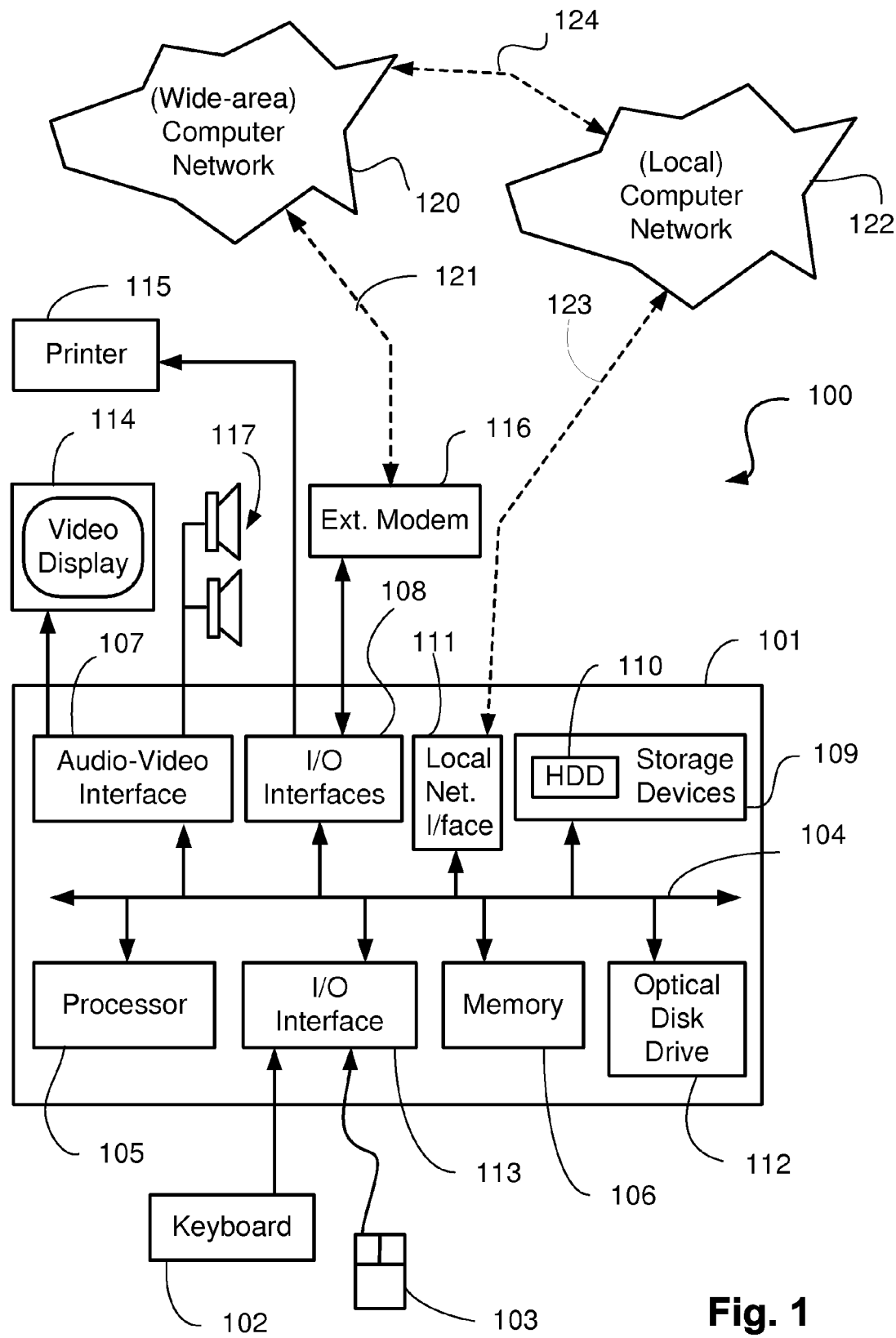
FIG. 1 is a schematic block diagram of a general purpose computer on which the arrangements described may be practised.

The methods of evaluating the aesthetic quality of document pages and providing informative evaluation results as feedback to be described may be implemented using a computer system 100, such as that shown in FIG. 1 wherein the processes of FIGS. 2 to 15 may be implemented as software, such as one or more application programs executable within the computer system 100. In particular, the steps of the methods are effected by instructions in the software that are carried out within the computer system 100. The instructions may be formed as one or more code modules, each for performing one or more particular tasks. The software may also be divided into two separate parts, in which a first part and the corresponding code modules perform the evaluation the aesthetic quality and provide informative evaluation results as feedback, and a second part and the corresponding code modules manage a user interface between the first part and the user. The code modules each form a means which, when operated collectively, provide for determining an aesthetic quality measure of a document page. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 preferably effects an advantageous apparatus for evaluating the aesthetic quality of document pages and providing informative evaluation results as feedback.

As seen in FIG. 1, the computer system 100 is formed by a computer module 101, input devices such as a keyboard 102 and a mouse pointer device 103, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g.: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide-area network 120 via a connection 124, which would typically include a so-called "firewall" device or similar functionality. The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such as optical disks (e.g.: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PCs and compatibles, Sun Sparcstations, Apple Mac™ or alike computer systems evolved therefrom.

Typically, the application programs discussed above are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable storage media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

Typically the system 100 is configured to execute a document layout application by which data, which may include variable data, is input into a predefined document format and by which the specific configuration of the document may be varied based upon the input data. The variability of such documents can lead to aesthetic concerns where certain documents depart from the intended predefined document format, which notionally has an acceptable aesthetic quality. Alternatively, the system 100 may operate upon arbitrary documents without knowledge of any predefined form or intend aesthetic appeal.

CREATION OF A MAP OF AESTHETIC MEASURE PROFILES

Figure 3:
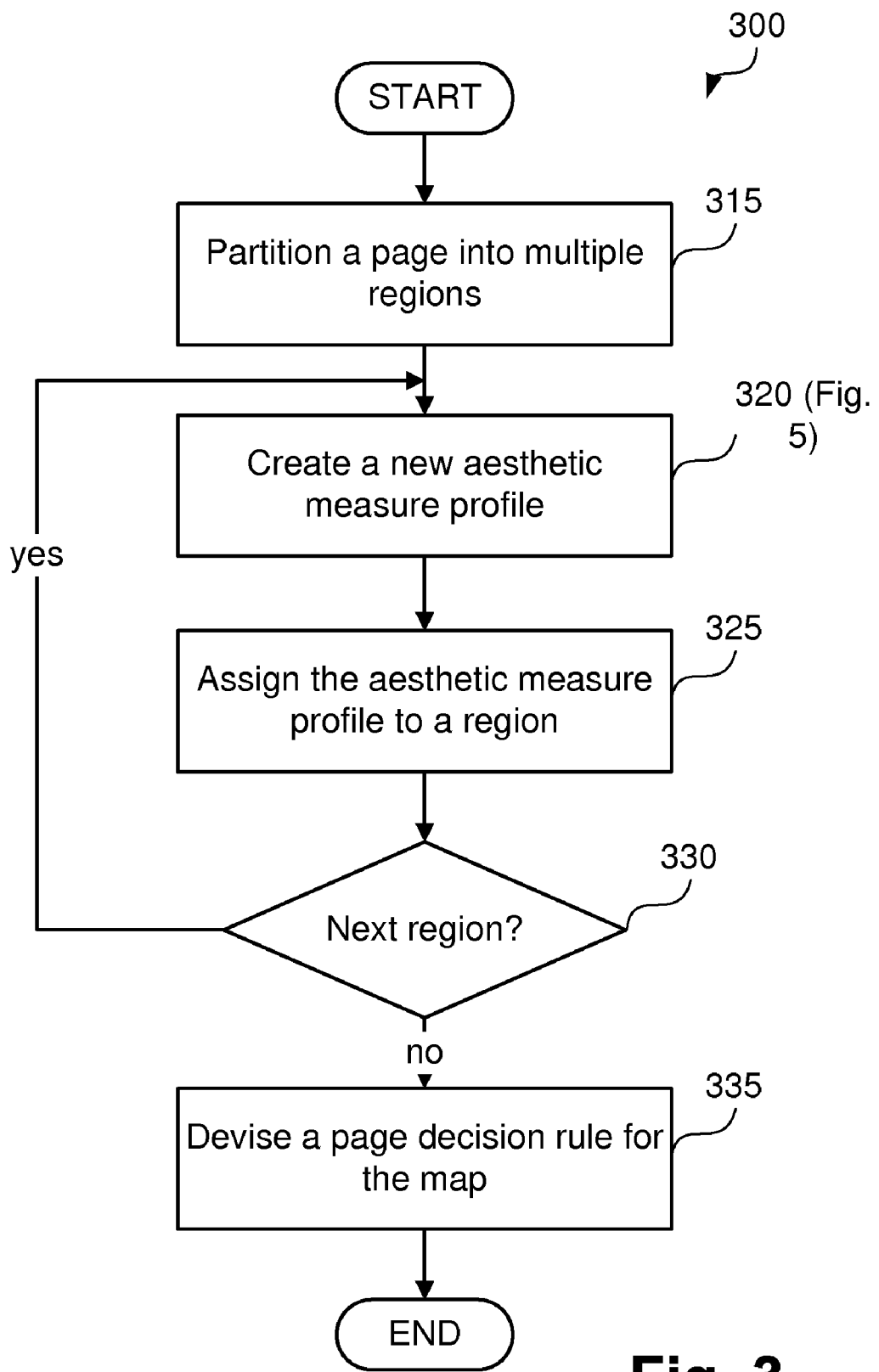
FIG. 3 is a schematic flow diagram illustrating a method of creating a map of aesthetic measure profiles.

According to the present disclosure, initially and before evaluating any one or more documents, a user is required to create a map of aesthetic measure profiles. Referring to FIG. 3, a method 300 of creating such a map can now be described. The method 300 is desirably implemented in software executable in the computer module 101, typically in concert with a GUI via which user input may be received. First, at step 315, the page is partitioned into multiple map regions. This may be performed manually by the user with the aid of a GUI representation of the page. The user may scribe bounding boxes about map regions of the page to distinguish one map region from another. In one implementation, static map regions are supported. However, in alternative implementations, map regions may be dynamically determined rather than predefined. The map regions may then be stored in the memory 106 or HDD 110. Next, each map region is processed one by one from step 320 to step 330. At step 320, the user creates a new aesthetic measure profile. An aesthetic measure profile refers to a set of measures of region properties and acceptability rules for measuring and evaluating a number of predetermined characteristics of a document region along with a region decision rule. Each aesthetic measure profile is assigned to a map region which represents a corresponding document region of a document to be assessed for aesthetic quality. Region decision rules are devised by users specifying, for example via the GUI, the measures of region properties and acceptability rules to be satisfied by a document region with acceptable aesthetic quality. In other words, region decision rules are used to assess the regional aesthetic quality acceptability of a document region. A preferred implementation for step 320 is described below with reference to FIG. 5. At step 325, the aesthetic measure profile is assigned to the current map region of the map. This again may be performed by the user in the manner described below. At step 330, if there are more map regions to be assigned with aesthetic measure profiles, processing returns to step 320 and each further map region is processed in turn. Otherwise, at step 335, the user devises a page decision rule (described below) which specifies the conditions for a page to pass the overall evaluation against the map of aesthetic measure profiles. Finally, the method 300 concludes at which point the map is stored in the memory 106/109 for subsequent use in aesthetic page analysis.

Figure 4:
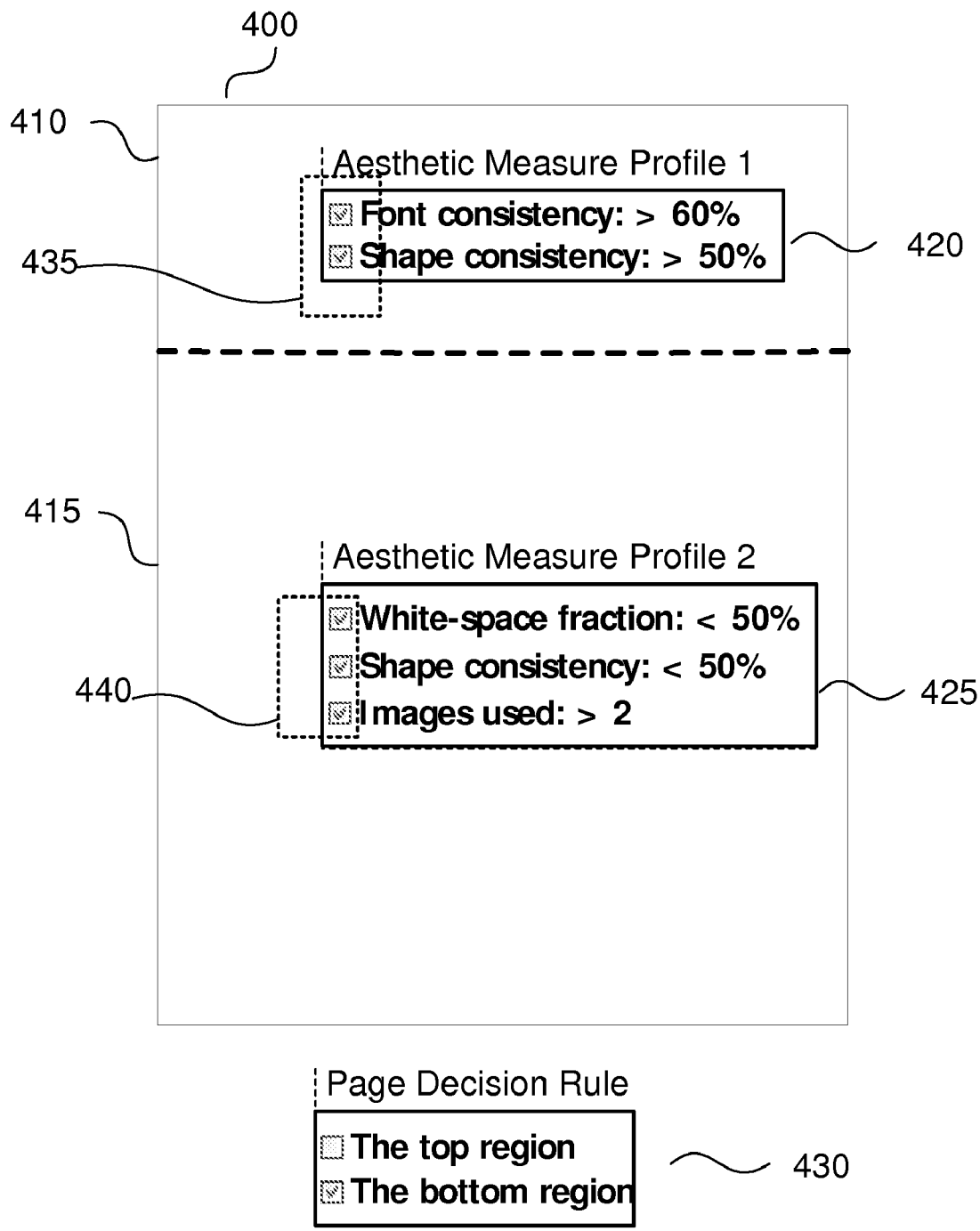
FIG. 4 shows an example of a map of aesthetic measure profiles.

FIG. 4 shows an example of a map 400 of aesthetic measure profiles. The map 400 of aesthetic measure profiles in this example consists of two map regions, a top map region 410 and a bottom map region 415. Each map region 410 and 415 has a corresponding aesthetic measure profile. An aesthetic measure profile 420 assigned to the top map region 410 specifies two parameters, font consistency and shape consistency, each being greater than 60% and 50% respectively. This emphasises strong consistency among layout objects. By contrast, the aesthetic measure profile 425 in the bottom map region 415 has a different focus and suggests that a more varied layout is permitted. A page decision rule 430, devised by the user for this map of aesthetic measure profiles, is also shown. The page decision rule 430 specifies that a document page with an acceptable aesthetic quality must satisfy the region decision rule 440 for its bottom document region corresponding to the map region 415 but, in this case, there is no requirement to pass the region decision rule 435 for the top document region corresponding to the map region 410. This is described in detail below with reference to FIG. 7.

In alternative embodiments, dynamic maps of aesthetic measure profiles consisting of dynamic map regions are created. In one implementation, the user defines different aesthetic measure profiles applicable to specific types of document contents. For example, the users can create one aesthetic measure profile for textual content and another aesthetic measure profile for non-textual content. When a document layout is received, metadata of the layout and optical character recognition software are used to partition the layout dynamically into textual and non-textual document regions based on the content of the document. Then, the aesthetic measure profiles are applied to the dynamically generated regions of the document accordingly.

In another implementation, users create maps of aesthetic measure profiles based on document templates, which are used to generate a number of documents to be assessed for aesthetic quality. First, a document template is fetched and all its content placeholders are automatically identified using the metadata of the template. Then, a map of aesthetic measure profiles is produced when aesthetic measure profiles created by the user are assigned to appropriate content placeholders of the template.

When a document to be assessed for aesthetic quality is received, based on the provided metadata, the document template used to generate the document is determined and the corresponding map of aesthetic measure profiles is fetched. The aesthetic measure profile of the map applies to different document regions of the assessed document depending upon which content placeholder each piece of content of the document is resided in.

Aesthetic Measure Profile Creation

Figure 5:
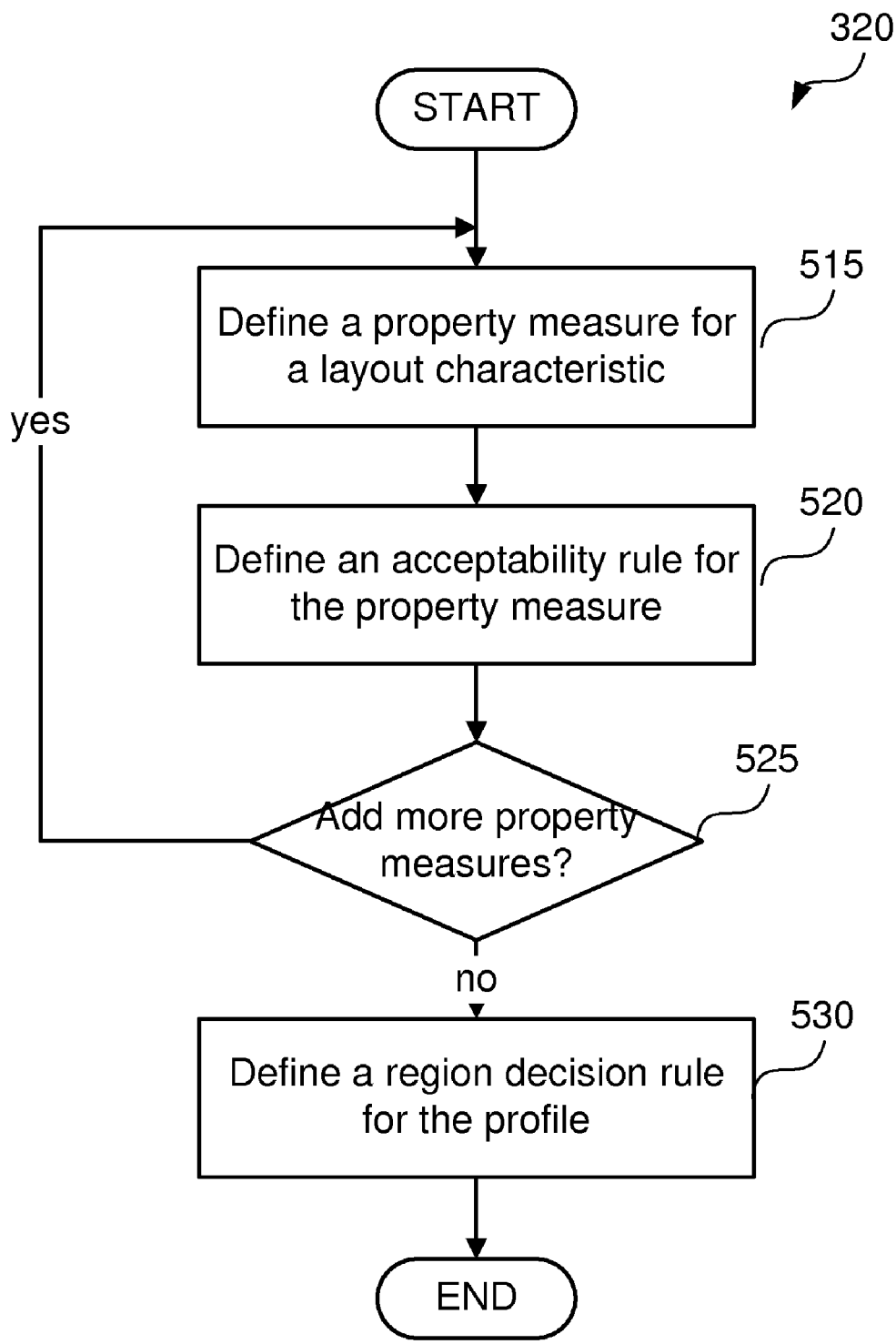
FIG. 5 is a schematic flow diagram illustrating a method of creating an aesthetic measure profile as used in the method of FIG. 3.

Step 320 is now discussed in more detail with reference to FIG. 5, which shows the method of creating a new aesthetic measure profile for a map region containing one or more property measures with corresponding acceptability rules. At step 515, the user defines a new property measure in terms of a mathematical formula for specifying how a layout characteristic of the document region should be measured. For example, when the user defines a white-space fraction measure, a common formula in this area of technology, such as:

$$V_{ws}=1-4((\Sigma A_i/A_p)-0.5)^2 \times 100\%,$$

is provided, where $A_p$ refers to an area and $A_i$ is an object area. The formula determines the amount of white space in a document region. At step 520, the user defines an acceptability rule in terms of a predefined range for the defined property measure representing an acceptable aesthetic quality level for a document region. The acceptability rule preferably generates a pass/failure Boolean result. In alternative implementations, other acceptability rules may be configured to generate non-Boolean results, e.g. low, low-average, average, high-average, high. At step 525, if the user wants to add more property measures to the profile, processing returns to step 515. Otherwise the method 320 proceeds to step 530. At step 530, the user defines a region decision rule to determine whether a document region has an acceptable aesthetic quality based the property measures and acceptability rules. The region decision rule of an aesthetic measure profile refers to the condition(s) that a document region must satisfy in order to be declared as having an acceptable aesthetic quality. Methods provided for users to input and structure region decision rules can be different in different applications. In one application, the user defines a region decision rule by simply selecting mandatory property measures and acceptability rules for evaluation using check boxes. Alternatively, rules may be selected from predefined lists with user settable variable parameters. Then, the step 320 concludes.

Figure 6:
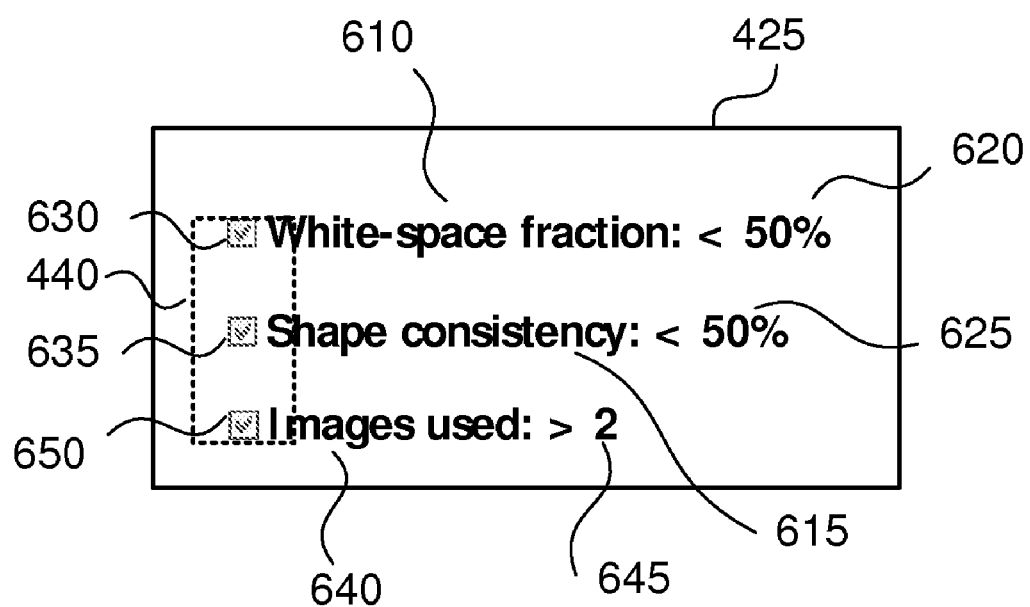
FIG. 6 shows an example of an aesthetic measure profile from the exemplary map of FIG. 4.

FIG. 6 illustrates the exemplary aesthetic measure profile 425 as comprising three property measures, white-space fraction 610, shape consistency 615 and images used 640. The names of the property measures 610, 615 and 640 refer to the amount of white space, the consistency of shapes among layout objects and the number of images used in a document region corresponding to the map region 415. Each property measure has an acceptability rule. In this case, the acceptability rule 620 for the white-space fraction measure 610 specifies that an aesthetically pleasing document region should have less than 50% of white space out of the total region area. The acceptability rule 625 specifies that shape consistency among layout objects inside a document region should be less than 50% and acceptability rule 645 specifies that the region must contain more than two images. With all check boxes 630, 635 and 650 checked, the region decision rule 440 for this profile 425 states that a document region is acceptably aesthetically pleasing only if the white-space fraction and shape consistency measures are less than 50% and the document region contains more than two images.

Page Decision Rules

Figure 7:
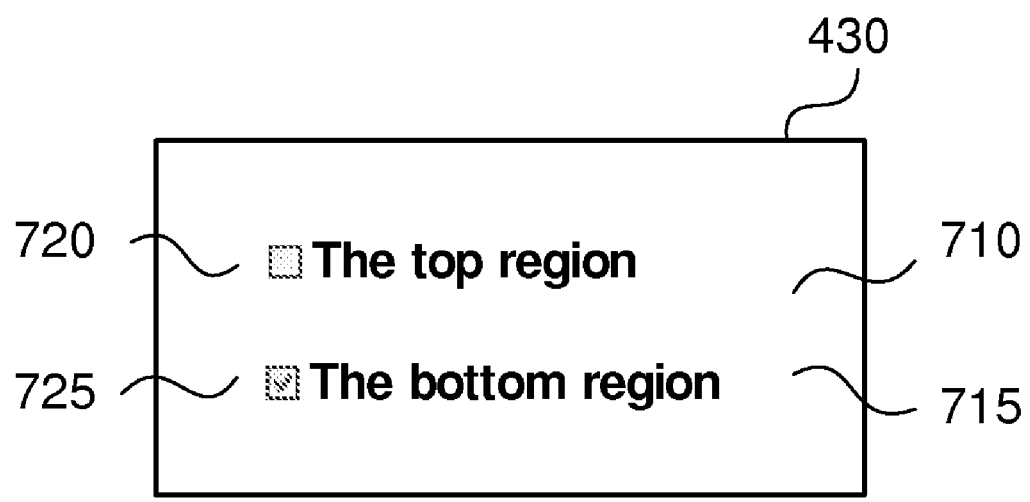
FIG. 7 shows an example of a page decision rule from the exemplary map of FIG. 4.

Page decision rules are used in step 235 of method 200, which is yet to be described. The page decision rules refer to the conditions that a document page must satisfy based on region decision rules in order to be declared as having an acceptable aesthetic quality. In one implementation, the method step 335 of devising a page decision rule is similar to the method step 530 described above of defining a region decision rule for an aesthetic measure profile. FIG. 7 shows the page decision rule 430 of FIG. 4 in more detail. A list of map regions of the map of aesthetic measure profiles 400 is compiled and presented to the user to select relevant map regions, 710 or 715, using the check boxes 720 and 725. Document regions of a page corresponding to the selected map regions must pass the evaluations of corresponding aesthetic measure profiles according to their respective region decision rules for the whole page to be declared as aesthetically pleasing. According to the selection in the example page decision rule 430, the user specifies that document pages with an acceptable aesthetic quality must pass the evaluation of aesthetic measure profiles in the bottom document region only. In alternative implementations, more complex page decision rules, such as dependency relationships among map regions, may be entered using script languages.

ASTHETIC EVALUATION

Figure 2:
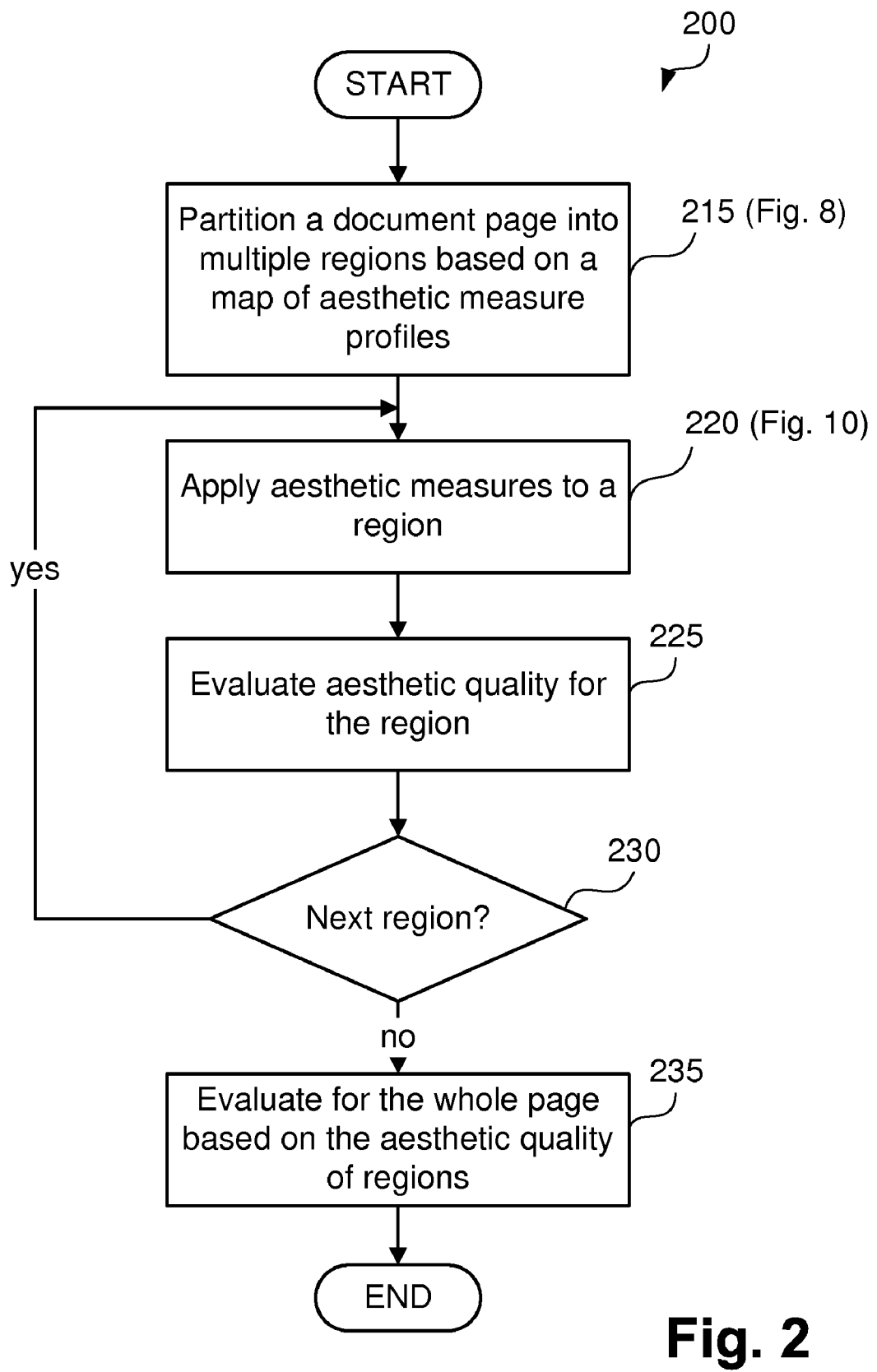
FIG. 2 is a schematic flow diagram illustrating a method of applying a map of aesthetic measure profiles to a page.

FIG. 2 shows a method 200 of evaluating the aesthetic quality of a page based on a map of aesthetic measure profiles. The aesthetic evaluation method 200 commences at step 215, where a page to be evaluated is partitioned into multiple document regions based on the map of aesthetic measure profiles. This is described in more detail later with reference to FIG. 8. Next, each document region of the page is processed one by one from steps 220 to step 230. Step 220 measures layout characteristics of a document region using a corresponding aesthetic measure profile from the map of aesthetic measure profiles. This is also described later, with reference to FIG. 10. At step 225, the aesthetic quality of the document region is evaluated based on the corresponding region decision rule. Region decision rules are devised by users specifying the acceptability rules on the layout characteristics to be satisfied by a document region with acceptable aesthetic quality. At step 230, if there are more document regions to be evaluated, processing returns to step 220. Otherwise, step 235 applies a page decision rule to evaluate the overall aesthetic quality of the page. Page decision rules are devised by users as described above and specify the region decision rules to be satisfied by a page with acceptable aesthetic quality based on the aesthetic quality acceptability of individual document regions. Finally, the method 200 concludes.

PAGE PARTITION

Figure 8:
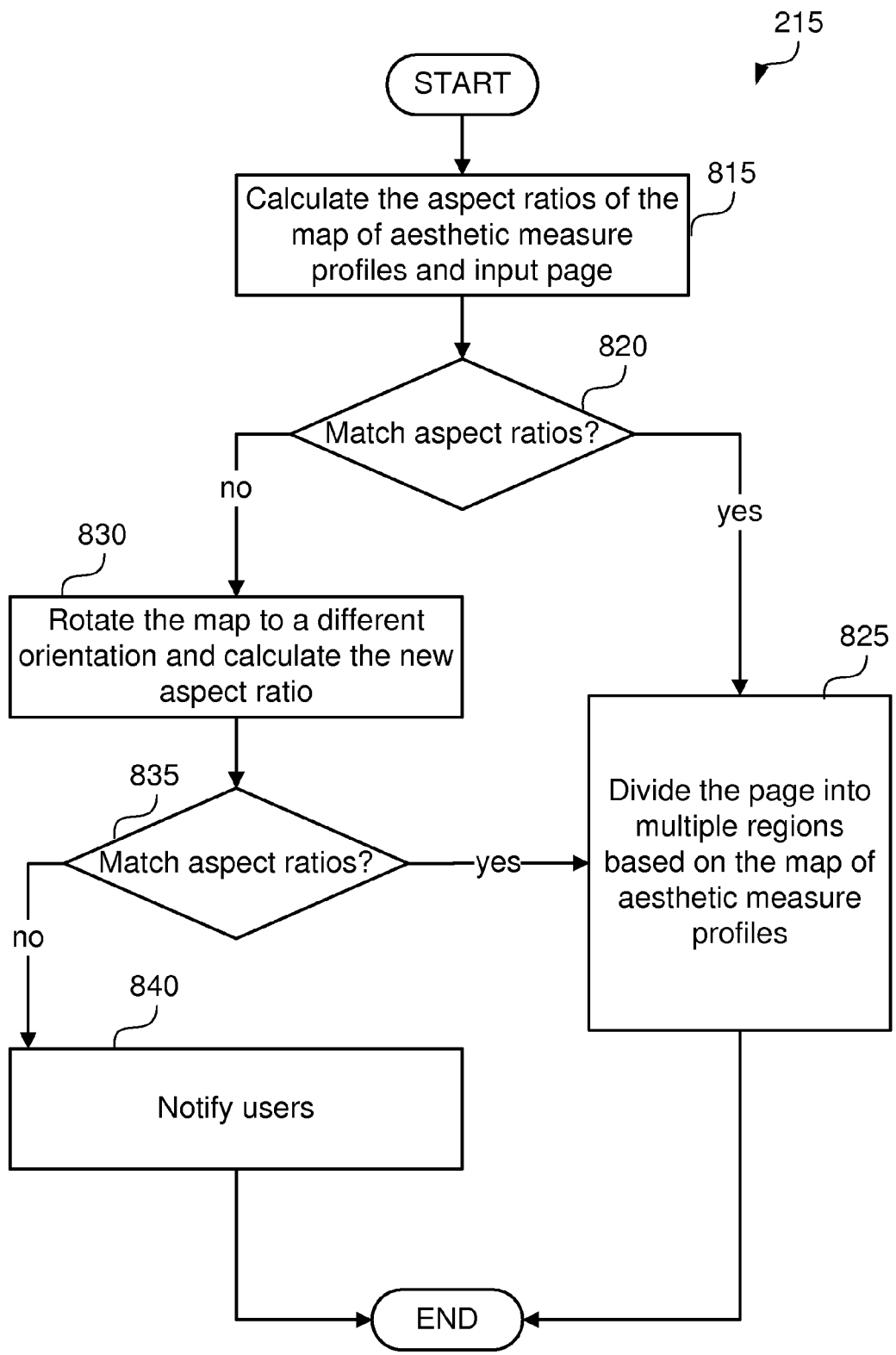
FIG. 8 is a schematic flow diagram illustrating a method of dividing a page into multiple document regions based on a map of aesthetic measure profiles as used in the method of FIG. 2.
Figure 9:
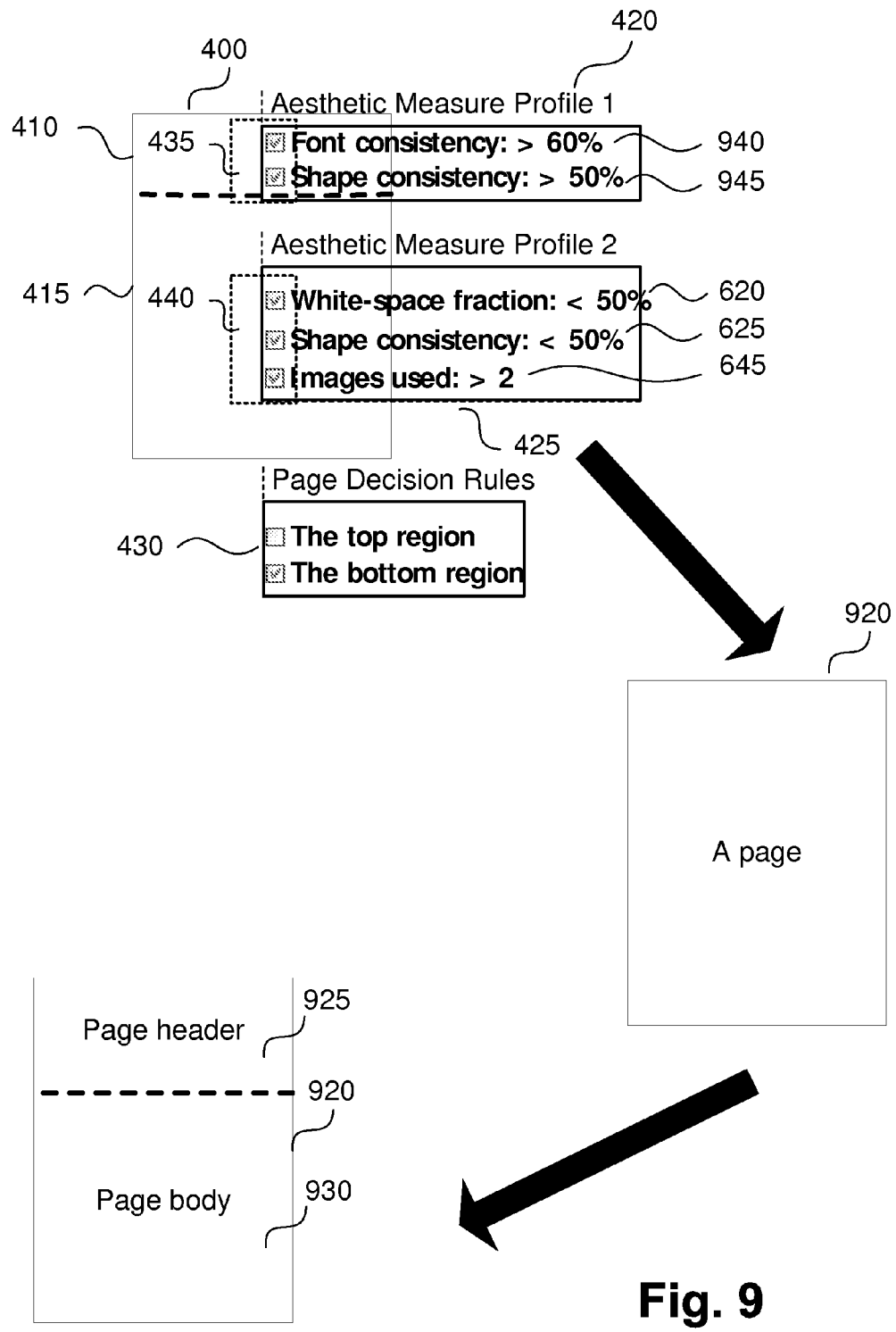
FIG. 9 illustrates how an exemplary page is divided into multiple document regions based on the exemplary map of aesthetic measure profiles of FIG. 4.

Step 215 is now described in more detail with reference to FIG. 8. A page to be evaluated aesthetically based on a map of aesthetic measure profiles has to be partitioned into document regions according to the map. Referring to FIG. 8, step 815 calculates the aspect ratio of the map of aesthetic measure profiles and the aspect ratio of the page, being determined from the whole page upon which the map is built. At step 820, if the two calculated aspect ratios match, processing continues to step 825. Step 825 divides the page into multiple document regions according to the map of aesthetic measure profiles. Then, step 215 concludes. However, if the two aspect ratios are different, processing continues to step 830. Step 830 rotates the map of aesthetic measure profiles to a different orientation, e.g. 90 degrees clockwise, and calculates a new aspect ratio. This involves rotating the whole page of the map. Next, step 835 compares the new aspect ratio to the aspect ratio of the page. If they match, processing goes to step 825 which partitions the page accordingly. Otherwise, processing continues to step 840. Step 840 notifies the user of a failure of the attempted application of aesthetic measures to a page. Afterwards, step 215 concludes. If a notification of step 840 occurs, the method 200 also fails and requires the user to re-specify the page, or the layout or the profiles of the map, so that the evaluations may be again attempted. FIG. 9 illustrates the partitioning of a page 920 based on the exemplary map of aesthetic measure profiles 400. The page 920 is divided into two document regions, one small "header" region at the top 925 and one large "body" region at the bottom 930 and to which the aesthetic measure profiles 420 and 425 and page decision rule 430 apply.

AESTHETIC MEASURES

Figure 10:
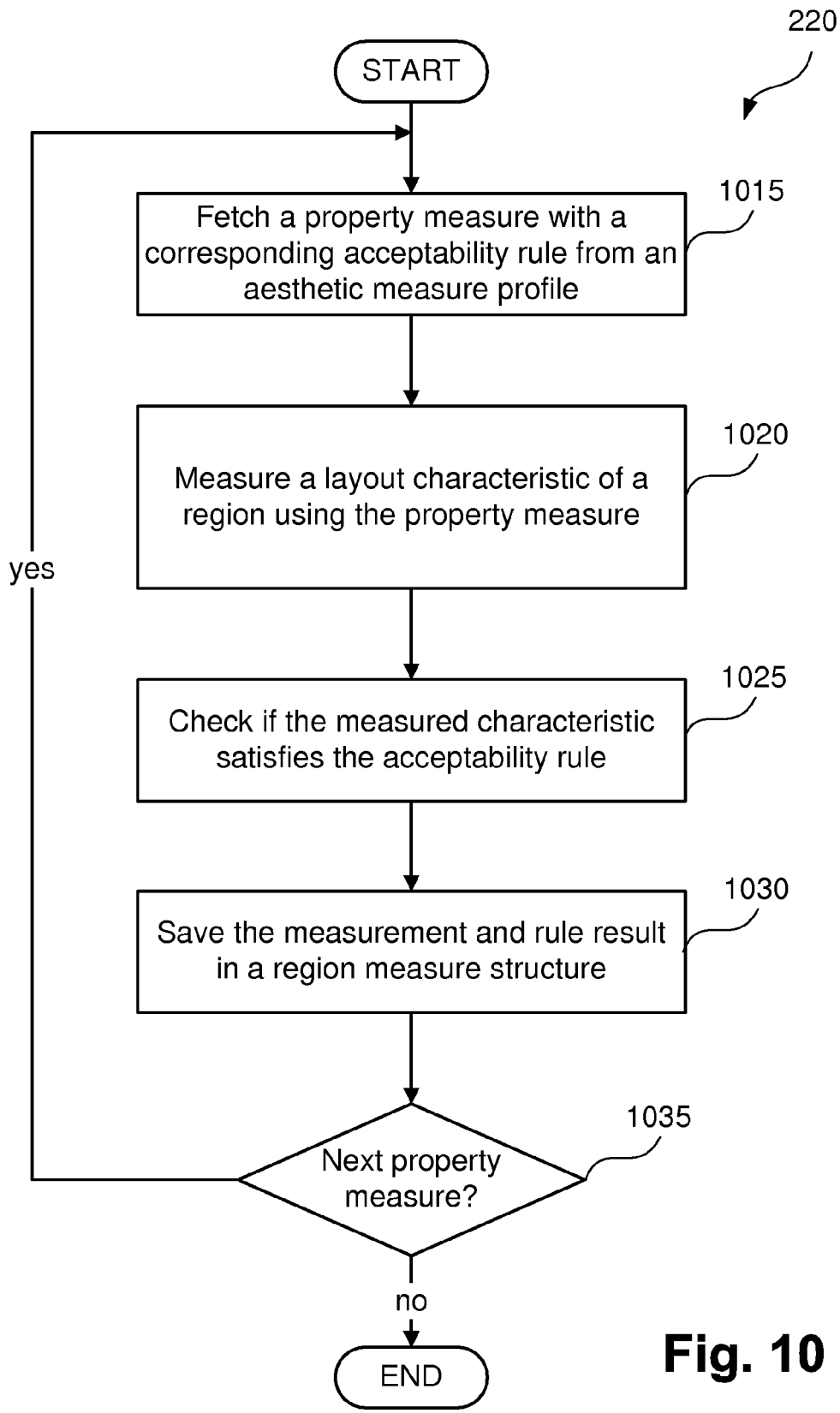
FIG. 10 is a schematic flow diagram illustrating a method of applying aesthetic measures to a document region of a page using an aesthetic measure profile from a map as used in the method of FIG. 2.

Step 220 is now described in more detail with reference to FIG. 10. Step 220 covers applying an aesthetic measure profile to a designated document region of a page according to a map of aesthetic measure profiles. First, step 1015 fetches a property measure and a corresponding acceptability rule from the aesthetic measure profile. This could for example be any of the rules 940, 945, 620, 625 and 645 seen in FIG. 9. Next, step 1020 applies the property measure as a mathematical formula to measure a layout characteristic of the document region. Then, step 1025 examines whether the document region has an acceptable aesthetic quality level determined by satisfying the acceptability rule corresponding to the layout characteristic. Step 1030 saves the measurement of the layout characteristic and the acceptability rule result into a dedicated storage structure, called a region measure structure. This storage structure may be formed in the memory 106 or the HDD 110. At step 1035, if more property measures are in the aesthetic measure profile, processing returns to step 1015. Otherwise, step 220 concludes.

Figure 11:
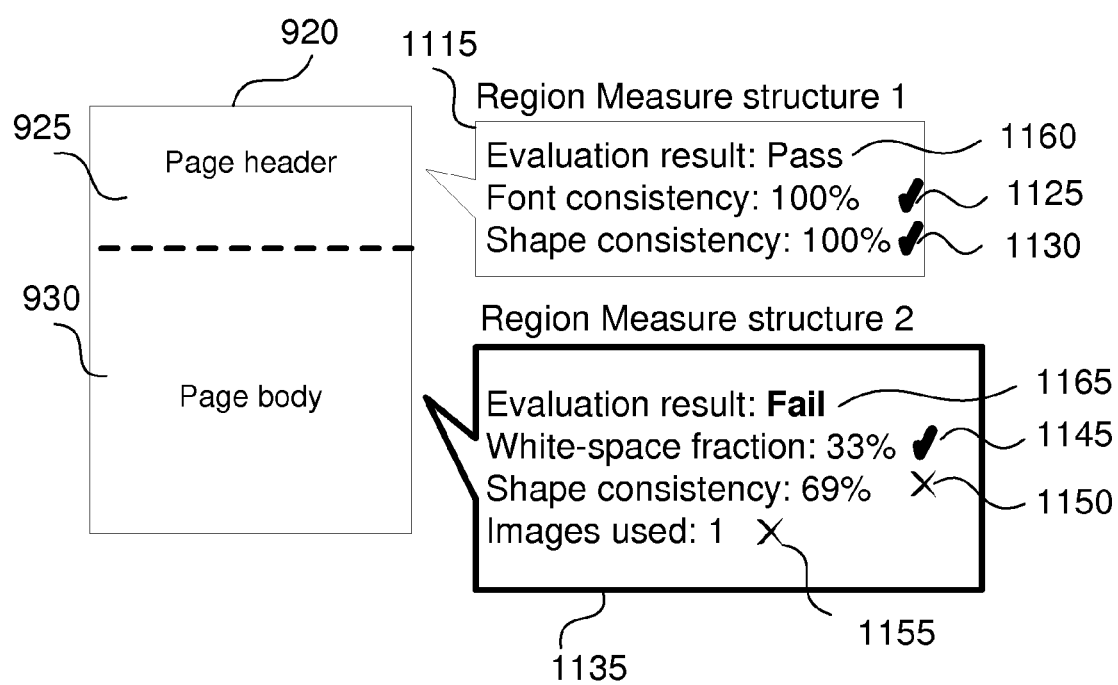
FIG. 11 is an illustration of the evaluation outcome after applying the exemplary map of aesthetic measure profiles of FIG. 4 to the page of FIG. 9.

FIG. 11 shows two region measure structures 1115 and 1135 after applying aesthetic measure profiles to the document regions 925 and 930 of the page 920 using the map 400 of aesthetic measure profiles. In the region measure structure 1115, there are two saved measurements with corresponding acceptability rule results. As seen, the font consistency of the header document region 925 is 100% and the rule result is illustrated by a tick 1125 which records that the measurement passes the corresponding acceptability rule 940. Similarly, the shape consistency of the header document region 925 is 100% and the rule result is illustrated by a tick 1130 which records that the measurement passes the acceptability rule 945. In the region measure structure 1135, there are three saved measurements with corresponding rule results. The white-space fraction of the body document region 930 is 33% and the rule result is illustrated by a tick 1145 that records that the measurement passes the acceptability rule 620. The shape consistency of the body document region 930 is 69% and the rule result is illustrated by a cross 1150 that records that the measurement fails the acceptability rule 625. Finally, only one image is used in the body document region 930 and the rule result is illustrated by a cross 1155 that records that the measurement fails the acceptability rule 645.

EVALUATION

Figure 12:
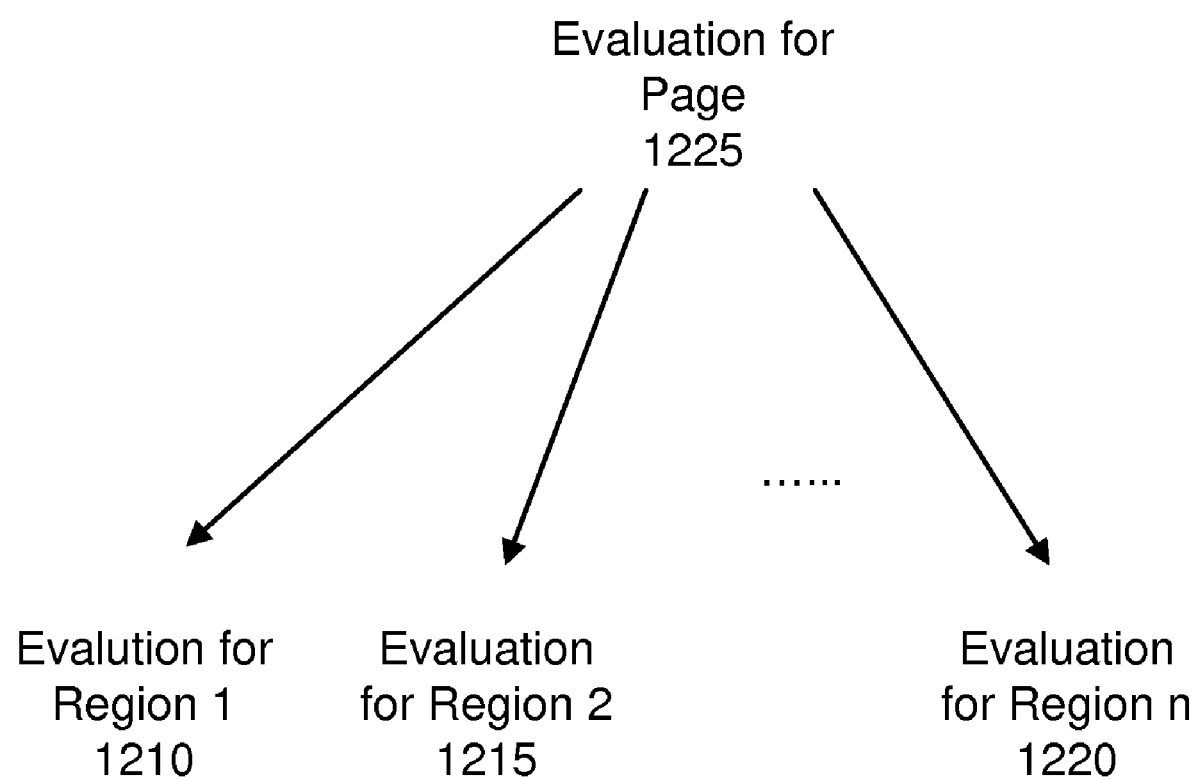
FIG. 12 is a hierarchical diagram illustrating different levels of aesthetic evaluation for single-page documents.

As shown in FIG. 12, there are preferably two levels of evaluation, one at the region level and one at the page level. Region evaluation applies to all document regions of a page as depicted by 1210, 1215 and 1220. Results are saved in region measure structures and indicate whether each document region has an acceptable aesthetic quality or not according to the corresponding region decision rule. Then, results of region evaluations are examined in page evaluation 1225 to determine whether a page as a whole is aesthetically pleasing according to the page decision rule.

Region Evaluation

Step 225 of method 200 is now described in more detail. Region evaluation is conducted after applying aesthetic measures to a document region and measurements against acceptability rules. All rule results within a region measure structure are examined to check whether they satisfy the corresponding region decision rule specified in the aesthetic measure profile. Then, the evaluation result is saved in the region measure structure. For example, referring to the region measure structure 1115 in FIG. 11, the document region 925 satisfies the font consistency and shape consistency requirements and the result 1160 is saved in the structure 1115 as passing the region decision rule 435 of the aesthetic measure profile 420. On the other hand, the document region 930 fails the white-space fraction and images used measures, but passes the shape consistency measure. The evaluation result 1165 as failing the region decision rule 440 of the aesthetic measure profile 425 is saved in the region measure structure 1135.

Page Evaluation

Step 235 of method 200 is now discussed in more detail. Page evaluation is conducted after applying aesthetic measures and region evaluation to all document regions of a page. All region evaluation results are examined to check whether they satisfy the page decision rule of the map of aesthetic measure profiles. Referring to FIG. 9, in that specific example, the page decision rule 430 states that an aesthetically pleasing page must have the bottom region that passes the region decision rule 440 of the corresponding aesthetic measure profile 425. The page 920 is evaluated to have an unacceptable aesthetic quality because its bottom document region 930 fails the region decision rule 440 of the corresponding aesthetic measure profile 425 as recorded by the Fail designation 1165 in the region measure structure 1135.

EXTENSIONS

Multi-page Map

Figure 13:
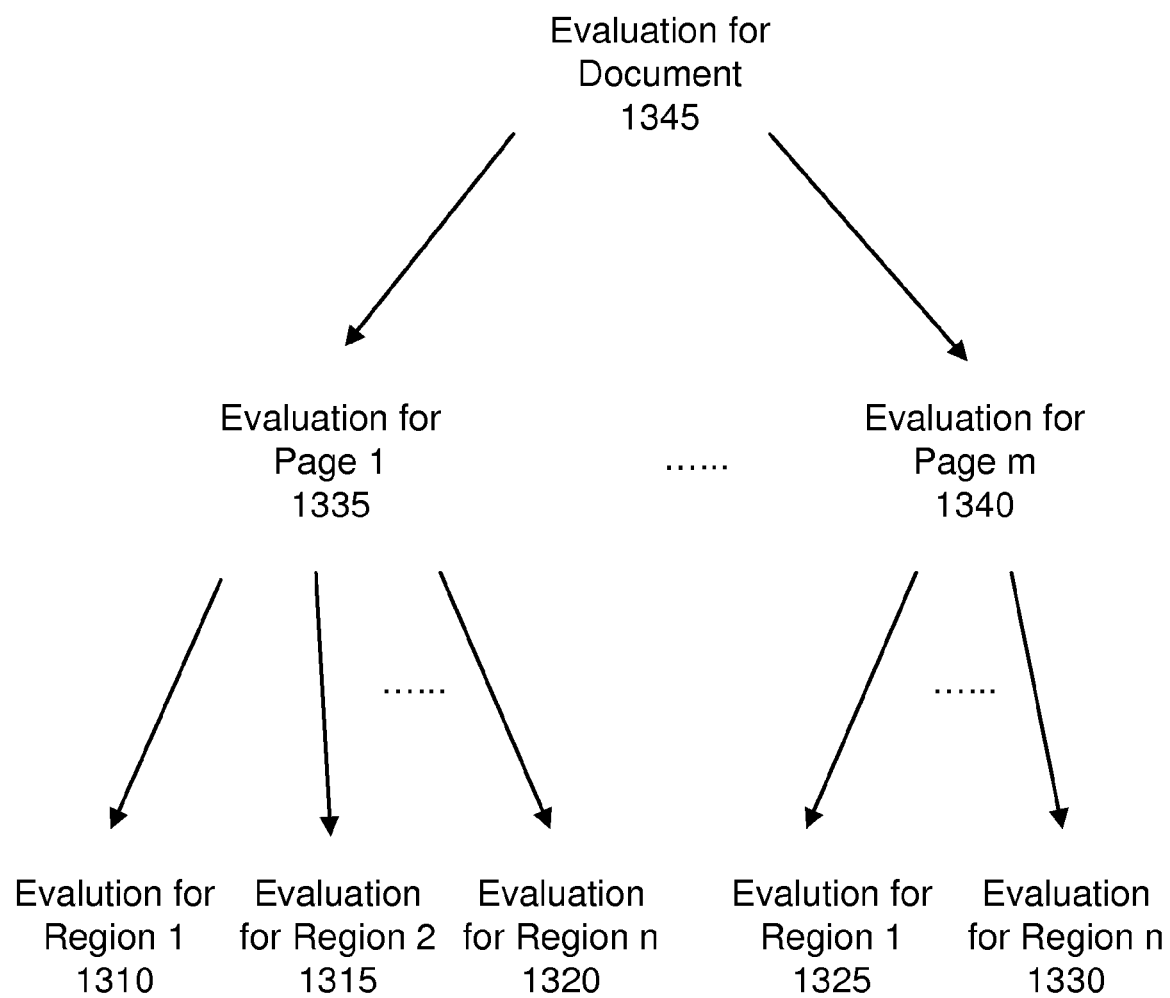
FIG. 13 is a hierarchical diagram illustrating different levels of aesthetic evaluation for multi-page documents.

In an alternative implementation, the construction of multi-page document maps for measuring the aesthetic quality of multiple-page documents is supported. During the process of creating a multi-page map of aesthetic measure profiles, the user is able to add document decision rules to the map to specify how to evaluate a multi-page document based on the evaluation results of individual pages. Referring to FIG. 13, there are three levels of evaluation for multi-page documents. Items 1310 to 1330 represent region evaluations, as in step 225, applied to individual document regions on different pages. Next, items 1335 and 1340 are page evaluations that apply to individual pages, as in step 235 as described above. Each page examines document region results to derive the aesthetic quality for the page which, once determined can be stored in the memory 106/109. At the top level, the document evaluation 1345 derives the aesthetic quality for the whole document, taking into consideration the aesthetic quality of individual pages.

Given a multi-page document, the user can then specify those pages to which the document map applies, and thereby evaluate those pages of the multi-page document. The aesthetic evaluation of each page follows the method 200.

Recommendation Generation

Figure 14:
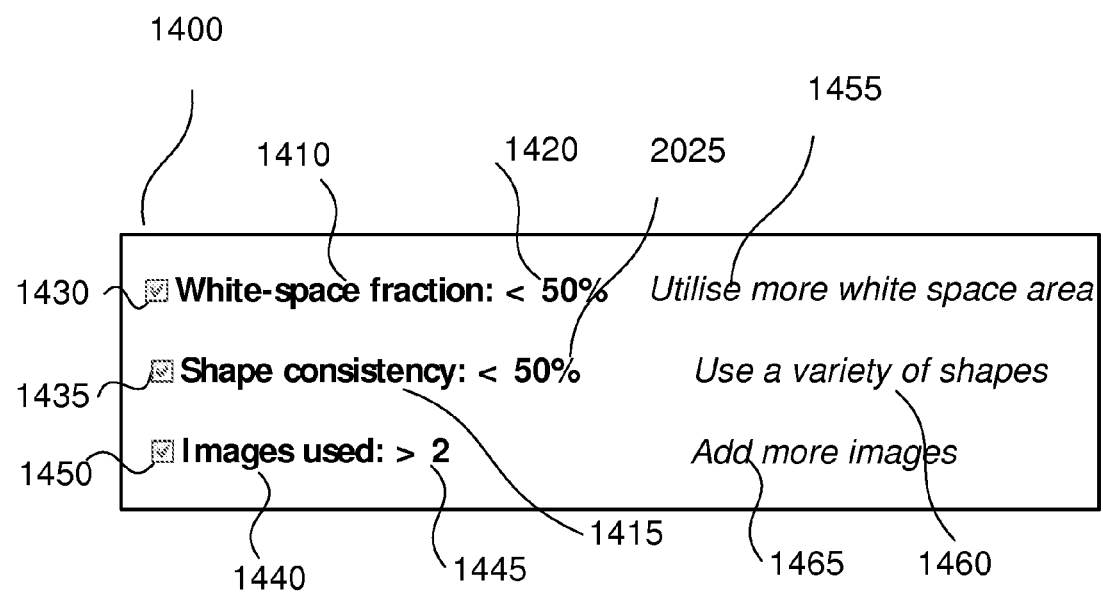
FIG. 14 is an illustration of the exemplary aesthetic measure profile of FIG. 6 supplemented with recommendation information.

In a further alternative implementation, based on saved layout measurements and acceptability rule results in a region measure structure, specific recommendations can be generated for layout enhancements. In the process of creating an aesthetic measure profile as shown in FIG. 5, between step 520 and step 525, the user can provide predefined recommendations about how a document region can be enhanced to satisfy the layout characteristic measured by a property measure. FIG. 14 illustrates an aesthetic measure profile supplemented with recommendations. Items 1410 to 1450 are the same as items 610 to 650. For each property measure in the aesthetic measure profile 1400, a recommendation is included. Recommendations 1455, 1460, and 1465 are specified for property measures 1410, 1415 and 1440, respectively.

Figure 15:
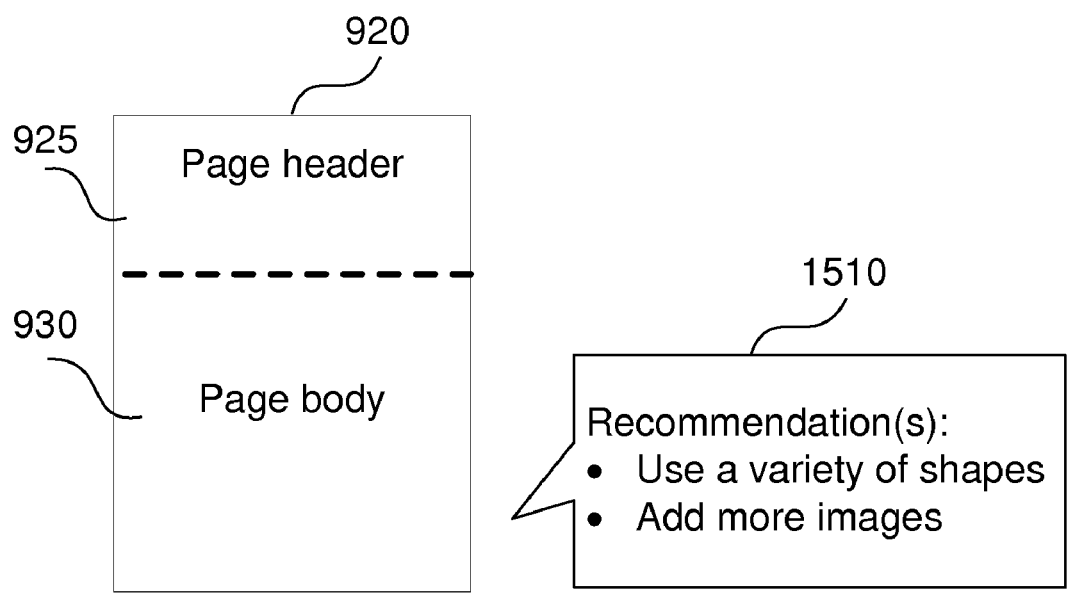
FIG. 15 shows recommendations generated using the profile of FIG. 14 based on aesthetic evaluation result.

Recommendations for a document region which fails to satisfy the region decision rule of an aesthetic measure profile are compiled by collating recommendations of the property measures that caused the document region to fail the region decision rule. For example, the recommendations 1510 in FIG. 15 are generated by collating the recommendations 1460 and 1465 for the property measures 1415 and 1440, respectively, since the document region 930 fails its region decision rule due to the acceptability rule failures recorded at 1150 and 1155 in the region measure structure 1135. Where the arrangements described are executed within a GUI, the recommendation 1510 may be dynamically displayed in the GUI on the display 114 over the page being aesthetically assessed to hint to the user a possible solution to achieve aesthetic acceptability.

Industrial Applicability

The arrangements described are applicable to the computer and data processing industries and particularly to the automated assessment of documents with respect to user aesthetic criteria, which may be predefined or used generated/modified.

The foregoing describes only some embodiments of the present invention, and modifications and/or changes can be made thereto without departing from the scope and spirit of the invention, the embodiments being illustrative and not restrictive.

I claim:

1. A method of determining an aesthetic quality of a document page, said method comprising the steps of:
   (a) providing a map defining (1) a plurality of map regions, each of said map regions having at least one profile, and (2) a page rule, each said profile comprising:
   (i) one or more measures of region properties; and (ii) an acceptability rule corresponding to each said measure to determine a regional aesthetic quality acceptability;

(b) partitioning the document page into a plurality of document regions according to said map regions of the provided map;

(c) evaluating each said partitioned document region based upon a corresponding one of said provided profiles to determine a corresponding said regional aesthetic quality acceptability identifying whether said partitioned document region is of acceptable aesthetic quality; and (d) determining said aesthetic quality for said document page based on each determined regional aesthetic quality acceptability and said page rule defined by said map.

2. A method according to claim 1, wherein each said profile further comprises (iii) a region decision rule, and step (c) further comprises determining a regional aesthetic quality acceptability based on evaluations of the acceptability rules for the corresponding measures of specified ones of said region properties.

3. A method according to claim 1, wherein said plurality of regions in said map is provided based on a content of the document page.

4. A method according to claim 3, wherein said content is retrieved based on an optical character recognition on the document page.

5. A method according to claim 1, wherein said plurality of regions in said map is provided based on a metadata of the document page.

6. A method according to claim 1, wherein said evaluating comprises the steps of:
(ca) measuring a layout characteristic of said region;
(cb) determining whether each said measured layout characteristic satisfies the corresponding acceptability rule; and
(cc) determining whether said region is of acceptable aesthetic quality according to said region decision rule and a result of one or more said acceptability rules.

7. A method according to claim 1, wherein said page decision rule specifies one or more said region decision rules to be satisfied by said page.

8. A method according to claim 1, wherein at least one said measure of region properties has associated therewith a recommendation, said method further comprising, where the corresponding region is determined not to be of acceptable aesthetic quality, the step of:
(e) displaying the recommendation associated with the corresponding region property measure.

9. A method of generating a map of aesthetic measure profiles adapted to be used to determine the aesthetic quality of a document page, said method comprising:
(a) partitioning the document page into a plurality of regions;
(b) generating, for each said region, a profile corresponding to said region, said profile comprising:
(i) one or more measures of region properties;
(ii) an acceptability rule corresponding to each said measure; and
(iii) a region decision rule based on the results of one or more of said acceptability rules; and
(c) generating said map for said document page, said map comprising said profile for each said region and a page decision rule based on the results of one or more said region decision rules.

10. A method of determining the aesthetic quality of a multiple page document, said method comprising the steps of:

(A) determining an aesthetic quality of each document page of said multiple page document, said determining comprising, for each said document page, the sub-steps of:
(a) providing a predetermined map corresponding to said document page, said predetermined map defining (1) a plurality of map regions, each of said map regions having at least one profile, and (2) a page rule, each said profile comprising:
(i) one or more measures of region properties; and
(ii) an acceptability rule corresponding to each said measure to determine a regional aesthetic quality acceptability;
(b) partitioning the document page into a plurality of document regions according to said map regions of the provided map;
(c) evaluating each said partitioned document region based upon a corresponding one of said provided profiles to determine a corresponding said regional aesthetic quality acceptability identifying whether said partitioned document region is of acceptable aesthetic quality; and
(d) determining said aesthetic quality for said document page based on each determined regional aesthetic quality acceptability and said page rule defined by said map;
(B) evaluating the aesthetic quality of the document by applying the aesthetic quality of each said page to a predetermined document decision rule.

11. A computer readable storage medium having a computer program recorded thereon, the program being executable in a computer to determine an aesthetic quality of a document page, said program comprising:
code for providing a map defining (1) a plurality of map regions, each of said map regions having at least one profile, and (2) a page rule, each said profile comprising:
(i) one or more measures of region properties; and
(ii) an acceptability rule corresponding to each said measure to determine a regional aesthetic quality acceptability;
code for partitioning the document page into a plurality of document regions according to said map regions of the provided map;
code for evaluating each said partitioned document region based upon a corresponding one of said provided profiles to determine a corresponding said regional aesthetic quality acceptability identifying whether said partitioned document region is of acceptable aesthetic quality; and
code for determining said aesthetic quality for said document page based on each determined regional aesthetic quality acceptability and said page rule defined by said map.

12. A computer readable storage medium according to claim 11, wherein said code for evaluating comprises:
code for measuring a layout characteristic of said region;
code for determining whether each said measured layout characteristic satisfies the corresponding acceptability rule; and
code for determining whether said region is of acceptable aesthetic quality according to said region decision rule and the result of said one or more acceptability rules.

13. A computer readable storage medium according to claim 11, wherein said page decision rule specifies one or more said region decision rules to be satisfied by said page.

14. A computer readable medium according to claim 11, wherein at least one said measure of region properties has associated therewith a recommendation, said program further comprising, operative where the corresponding region is determined not to be of acceptable aesthetic quality:

code for displaying the recommendation associated with the corresponding region property measure.

15. A computer readable storage medium having a computer program recorded thereon, the program being executable in a computer to generate a map of aesthetic measure profiles adapted to be used to determine the aesthetic quality of a document page, said program comprising:

code for partitioning the document page into a plurality of regions;

code for generating, for each said region, a profile corresponding to said region, said profile comprising:
        (i) one or more measures of region properties;
        (ii) an acceptability rule corresponding to each said measure; and
        (iii) a region decision rule based on the results of one or more of said acceptability rules; and code for generating said map for said document page, said map comprising said profile for each said region and a page decision rule based on the results of one or more said region decision rules.

16. A computer readable storage medium having a computer program recorded thereon, the program being executable in a computer to determine the aesthetic quality measure of a multiple page document, said program comprising:

code for determining, for each document page of said multiple page document, a aesthetic quality measure for said document page, said code being executable for each said document page and comprising:
        sub-code for providing a predetermined map corresponding to said document page of said multiple page document, said map defining (1) a plurality of map regions, each of said map regions having at least one profile, and (2) a page rule, each said profile comprising:
            (i) one or more measures of region properties; and
            (ii) an acceptability rule corresponding to each said measure to determine a regional aesthetic quality acceptability;
        sub-code for partitioning the document page into a plurality of document regions according to said map regions of the provided map;
        sub-code for evaluating each said partitioned document region based upon a corresponding one of said provided profiles to determine a corresponding said regional aesthetic quality acceptability identifying whether said partitioned document region is of acceptable aesthetic quality; and
        sub-code for determining said aesthetic quality measure for said document page based on each determined regional aesthetic quality acceptability and said page rule defined by said map; and code for evaluating the aesthetic quality measure of the document by applying the aesthetic quality of each said page to a predetermined document decision rule.

17. A computer apparatus configured to determine an aesthetic quality measure of a document page, said computer apparatus comprising:

means for providing a map defining (1) a plurality of map regions, each of said map regions having at least one profile, and (2) a page rule, each said profile comprising:
        (i) one or more measures of region properties; and
        (ii) an acceptability rule corresponding to each said measure to determine a regional aesthetic quality acceptability;

means for partitioning the document page into a plurality of document regions according to said map regions of the provided map;

means for evaluating each said partitioned document region based upon a corresponding one of said provided profiles to determine a corresponding said regional aesthetic quality acceptability identifying whether said partitioned document region is of acceptable aesthetic quality; and means for determining said aesthetic quality measure for said document page based on each determined regional aesthetic quality acceptability and said page rule defined by said map.

\* \* \* \* \*